US010613756B2

(12) United States Patent
Shin et al.

(10) Patent No.: US 10,613,756 B2
(45) Date of Patent: Apr. 7, 2020

(54) HARDWARE-ACCELERATED STORAGE COMPRESSION

(71) Applicant: QUALCOMM Incorporated, San Diego, CA (US)

(72) Inventors: Hyunsuk Shin, San Diego, CA (US); Jung Pill Kim, San Diego, CA (US); Assaf Shacham, Zichron Yaakov (IL)

(73) Assignee: Qualcomm Incorporated, San Diego, CA (US)

( * ) Notice: Subject to any disclaimer, the term of this patent is extended or adjusted under 35 U.S.C. 154(b) by 191 days.

(21) Appl. No.: 15/254,986

(22) Filed: Sep. 1, 2016

(65) Prior Publication Data

US 2017/0068460 A1    Mar. 9, 2017

Related U.S. Application Data

(60) Provisional application No. 62/213,839, filed on Sep. 3, 2015.

(51) Int. Cl.
*G06F 3/06* (2006.01)

(52) U.S. Cl.
CPC ............ *G06F 3/0608* (2013.01); *G06F 3/064* (2013.01); *G06F 3/0611* (2013.01);
(Continued)

(58) Field of Classification Search
CPC .. G06F 2212/401; G06F 3/0608; G06F 3/064; G06F 3/0673; G06F 2212/1044;
(Continued)

(56) References Cited

U.S. PATENT DOCUMENTS 6,370,631 B1    4/2002  Dye
6,748,457 B2    6/2004  Fallon et al.
(Continued)

FOREIGN PATENT DOCUMENTS

WO     2015119974 A1    8/2015

OTHER PUBLICATIONS

International Search Report and Written Opinion—PCT/US2016/050185—ISA/EPO—dated Nov. 25, 2016.

*Primary Examiner* — Hashem Farrokh
(74) *Attorney, Agent, or Firm* — Muncy, Geissler, Olds & Lowe, P.C.

(57) ABSTRACT

Aspects disclosed in the detailed description include hardware accelerated storage compression. In one aspect, prior to writing an uncompressed data block to the storage device, a hardware compression accelerator provided in a storage controller compresses the uncompressed data blocks individually into a compressed data block and allocates the compressed data block to a storage data block in the storage device. The hardware compression accelerator then generates a modified logical block address (LBA) to link the uncompressed data block to the compressed data blocks. In another aspect, the hardware compression accelerator locates a compressed data block based on a corresponding modified LBA and decompresses the compressed data block into an uncompressed data block. By performing hardware accelerated storage compression in the storage controller, it is possible to reduce processing overhead associated with traditional software-based compression systems and improve compression control over traditional storage device driven compression systems.

29 Claims, 13 Drawing Sheets

(52) U.S. Cl.
CPC .......... *G06F 3/0613* (2013.01); *G06F 3/0625* (2013.01); *G06F 3/0631* (2013.01); *G06F 3/0659* (2013.01); *G06F 3/0661* (2013.01); *G06F 3/0665* (2013.01); *G06F 3/0673* (2013.01); *G06F 3/0679* (2013.01); *G06F 3/0688* (2013.01)

(58) Field of Classification Search
CPC .... G06F 3/0679; G06F 3/0659; G06F 3/0665; G06F 12/08; G06F 2212/1016; G06F 3/0611; G06F 3/0613; G06F 3/0631; G06F 2212/152; G06F 3/0625; G06F 2212/102; G06F 3/0661; G06F 3/0688
USPC ........................................................ 711/154
See application file for complete search history.

(56) References Cited

U.S. PATENT DOCUMENTS

| | | |
|---|---|---|
| 7,051,126 B1 | 5/2006 | Franklin |
| 8,111,707 B2 | 2/2012 | Riddle et al. |
| 8,694,703 B2 | 4/2014 | Hans et al. |
| 8,713,080 B2* | 4/2014 | Moloney ............. G06F 9/30043 708/169 |
| 8,954,654 B2 | 2/2015 | Yu et al. |
| 9,880,928 B1* | 1/2018 | Bono .................. G06F 12/0246 |
| 2006/0129785 A1* | 6/2006 | Ripberger ............. G06F 3/0619 711/173 |
| 2007/0016724 A1* | 1/2007 | Gaither ................. G06F 12/023 711/105 |
| 2008/0059728 A1* | 3/2008 | Daly ....................... G06F 12/08 711/158 |
| 2011/0004728 A1 | 1/2011 | Schuette |
| 2012/0290798 A1* | 11/2012 | Huang .................. G06F 3/0608 711/154 |
| 2013/0145085 A1* | 6/2013 | Yu ........................ G06F 12/0246 711/103 |
| 2015/0100736 A1 | 4/2015 | Galbraith et al. |
| 2015/0154118 A1 | 6/2015 | Marcu et al. |
| 2015/0293858 A1* | 10/2015 | Raam .................... G06F 21/606 713/193 |
| 2017/0031940 A1* | 2/2017 | Subramanian .... G06F 17/30138 |

* cited by examiner

| Block Address | Block Count | Task Parameters Field | | | | | | Attribute | | | |
|---|---|---|---|---|---|---|---|---|---|---|---|
| 63:32 | 31:16 | 15 | 14 | 13 | 12 | 11 | 10:7 | 6 | 5:3 | 2 | 1 | 0 |
| xxxx_xxxxh | xxxxh | Reliable Write | QBR | Priority | Data | Tag Request | Context | Forced Programming | Act= 101 | Int | End =1 | Valid =1 |

1000 — Task Descriptor Structure: Lower 64 bits (Data Transfer Tasks)

| | |
|---|---|
| Vendor Specific | Reserved |
| | 96 95             64 |
| | • 1-bit CE: Compression enable/disable<br>• n-bit CIDX: Compression algorithm array index |
| Implementation Specific | 0000000h |
| 127 | |

1002

Task Descriptor Structure: Upper 64 bits

New 64-bit parameter
• For READ COMMAND, S/W provides compression map info for up-to 32 block (128KB)
• For WRITE COMMAND, S/W issues command by filling 64-bit zeros. After write is complete, H/W provides compression map info for up-to 32 block back to S/W through this field

*FIG. 10A*

| | 31 | 27 26 25 24 23 | 16 15 | 7 5 | 0 |
|---|---|---|---|---|---|
| DW0 | Command Type(01h) | R  DD  I | Reserved | | |
| DW1 | 64-bit parameter<br>• For READ COMMAND, S/W provides compression map info for up-to 32 block (128KB)<br>• For WRITE COMMAND, S/W issues command by filling 64-bit zeroes. After write is complete, H/W provides Compression map info for up-to 32 block back to S/W through this field | | | | |
| DW2 | • 1-bit CE: Compression enable/disable<br>• n-bit CIDX: Compression algorithm array index | | Reserved | Overall Command Status | |
| DW3 | 64-bit parameter<br>• For READ COMMAND, S/W provides compression map info for up-to 32 block (128KB)<br>• For WRITE COMMAND, S/W issues command by filling 64-bit zeroes. After write is complete, H/W provides Compression map info for up-to 32 block back to S/W through this field | | | | |
| DW4 | UTP Command Descriptor Base Address | | | | |
| DW5 | UTP Command Descriptor Base Address Upper 32-bits | | | Reserved | |
| DW6 | Response UPIU Offset | | | Response UPIU Length | |
| DW7 | PRDT Offset | | | PRDT Length | |

Transfer Request Descriptor

*FIG. 10B*

HARDWARE-ACCELERATED STORAGE COMPRESSION

CROSS-REFERENCE TO RELATED APPLICATIONS

The present Application for Patent claims the benefit of Provisional Patent Application No. 62/213,839 entitled "Hardware-Accelerated Storage Compression" filed Sep. 3, 2015, and assigned to the assignee hereof and hereby expressly incorporated herein by reference in its entirety.

BACKGROUND

I. Field of the Disclosure

The technology of the disclosure relates generally to storage media compression.

II. Background

Mobile communication devices have become increasingly common in current society. The prevalence of these mobile communication devices is driven in part by the many functions that are now enabled on such devices. Increased processing capabilities in such devices means that mobile communication devices have evolved from being purely communication tools into sophisticated mobile multimedia centers, thus enabling enhanced user experiences.

Mobile communication devices rely on storage devices to store operating systems, system parameters, executable programs, and user data. Such storage devices may include hard-disk drive (HDD), solid-state disk (SSD), universal flash storage (UFS), universal serial bus (USB) storage device, and/or embedded multimedia card (eMMC).

Concurrent to increased processing capabilities of mobile communication devices, demand for data storage capacity has also grown exponentially. As a result, it is not uncommon for mobile communication devices to be embedded with storage devices that are capable of storing hundreds of gigabytes (GBs) of data. Unfortunately, increased storage capacity comes with increased cost and complexity. As such, it is often necessary to perform data compression in the mobile communication devices to help conserve storage space in the embedded storage devices. Unfortunately, conventional compression systems, such as software-based compression systems and storage device-based compression systems, suffer obvious issues with performance, latency, and controllability.

SUMMARY OF THE DISCLOSURE

Aspects disclosed in the detailed description include hardware-accelerated storage compression. In one aspect, prior to writing an uncompressed data block to a storage device, a hardware compression accelerator provided in a storage controller compresses the uncompressed data block into a compressed data block and allocates the compressed data block to a storage data block in the storage device. The hardware compression accelerator then generates a modified logical block address (LBA) to link the uncompressed data block to the compressed data block. In another aspect, the hardware compression accelerator locates a compressed data block based on a corresponding modified LBA and decompresses the compressed data block into an uncompressed data block. By performing hardware-accelerated storage compression in the storage controller, it is possible to reduce processing overhead associated with conventional software-based compression systems and improve compression control over conventional storage-device-driven compression systems. Further, hardware-accelerated storage compression may help improve data throughput and reduce power consumption associated with data compression.

An application may write the uncompressed data block to the storage device or read the uncompressed data block from the storage device by sending a write request or a read request to the storage controller via a host control interface (HCI). The write request and the read request may be encoded in existing HCI commands, such as HCI embedded multimedia card (eMMC) or HCI universal flash storage (UFS) commands.

In this regard, in one aspect, a host system is provided. The host system comprises a storage controller coupled to a storage device. The storage controller comprises a hardware compression accelerator. The host device also comprises a control system is configured to provide a write request to the storage controller to write one or more uncompressed data blocks to the storage device. Each of the one or more uncompressed data blocks is associated with a respective logical block address (LBA). For each uncompressed data block among the one or more uncompressed data blocks, the hardware compression accelerator is configured to: compress the uncompressed data block into a compressed data block; allocate the compressed data block to a storage data block in the storage device; and generate a modified LBA to correlate the uncompressed data block with the compressed data block, wherein the modified LBA comprises a compression bitmap.

In another aspect, a method for writing data to a storage device under a hardware-accelerated compression system is provided. The method comprises providing a write request to write one or more uncompressed data blocks to a storage device. Each of the one or more uncompressed data blocks is associated with a respective LBA. For each uncompressed data block among the one or more uncompressed data blocks the method provides compressing the uncompressed data block into a compressed data block; allocating the compressed data block to a storage data block in the storage device; and generating a modified LBA to correlate the uncompressed data block with the compressed data block, wherein the modified LBA comprises a compression bitmap.

In another aspect, a host system is provided. The host system comprises a storage controller coupled to a storage device. The storage controller comprises a hardware compression accelerator. The host system also comprises a control system configured to provide a read request to the storage controller to read one or more uncompressed data blocks from the storage device. For each uncompressed data block among the one or more uncompressed data blocks, the control system is further configured to provide a respective modified logical block address (LBA) that correlates the uncompressed data block with a respective compressed data block in the storage device, wherein the modified LBA comprises a compression bitmap. The storage controller is configured to retrieve the respective compressed data block from the storage device based on the respective modified LBA. The hardware compression accelerator is configured to decompress the respective compressed data block into the uncompressed data block. The storage controller is further configured to provide the uncompressed data block to the control system.

In another aspect, a method for reading data from a storage device under a hardware-accelerated compression system is provided. The method comprises providing a read request to read one or more uncompressed data blocks from a storage device; and for each uncompressed data block among the one or more uncompressed data blocks: providing a respective modified logical block address (LBA) that correlates the uncompressed data block with a respective compressed data block in the storage device, wherein the modified LBA comprises a compression bitmap; retrieving the respective compressed data block from the storage device based on the respective modified LBA; and decompressing the respective compressed data block into the uncompressed data block.

BRIEF DESCRIPTION OF THE FIGURES

FIG. 10A is a schematic diagram of an exemplary eMMC HCI data structure configured to define at least one compression algorithm for a hardware compression accelerator in the storage controller of FIG. 8;

FIG. 10B is a schematic diagram of an exemplary UFS HCI data structure configured to define at least one compression algorithm for a hardware compression accelerator in the storage controller of FIG. 8.

DETAILED DESCRIPTION

Figure 1A:
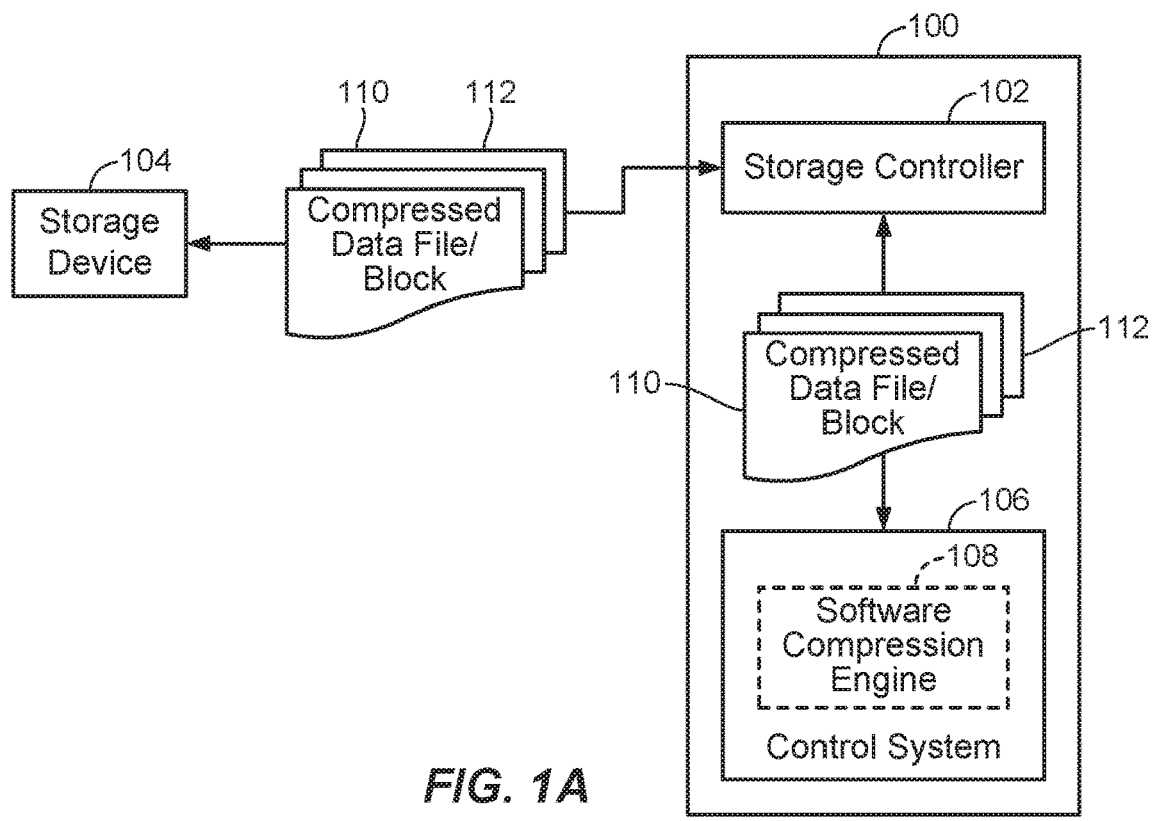
FIG. 1A is a schematic diagram of an exemplary host system configured to perform storage compression based on a conventional software-based compression system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include hardware-accelerated storage compression. In one aspect, prior to writing an uncompressed data block to a storage device, a hardware compression accelerator provided in a storage controller compresses the uncompressed data blocks individually into a compressed data block and allocates the compressed data block to a storage data block in the storage device. As used herein the term "storage data block" may refer to either a logical data block or a physical data block in the storage device. The hardware compression accelerator then generates a modified logical block address (LBA) to link the uncompressed data block to the compressed data block. In another aspect, the hardware compression accelerator locates a compressed data block based on a corresponding modified LBA and decompresses the compressed data block into an uncompressed data block. By performing hardware-accelerated storage compression in the storage controller, it is possible to reduce processing overhead associated with conventional software-based compression systems and improve compression control over conventional storage-device-driven compression systems. Further, hardware-accelerated storage compression may help improve data throughput and reduce power consumption associated with data compression.

An application may write the uncompressed data block to the storage device or read the uncompressed data block from the storage device by sending a write request or a read request to the storage controller via a host control interface (HCI). The write request and the read request may be encoded in existing HCI commands, such as HCI embedded multimedia card (eMMC) or HCI universal flash storage (UFS) commands.

Figure 1B:
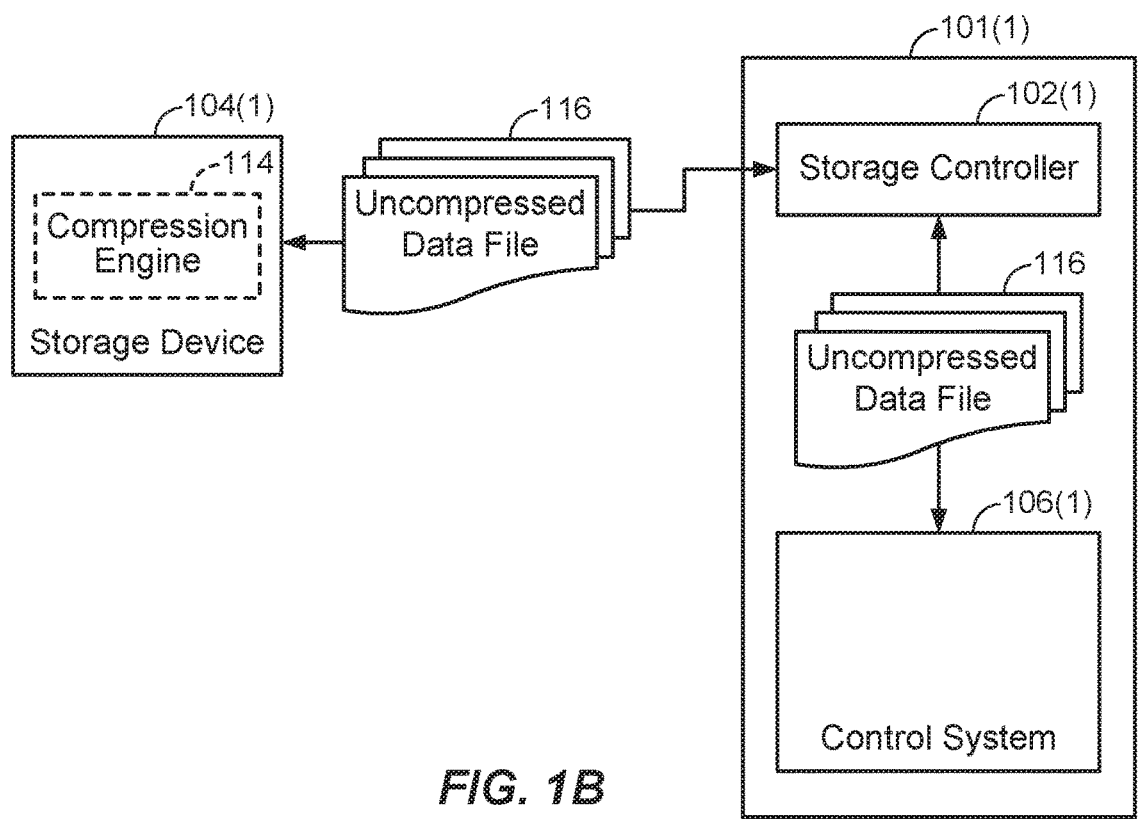
FIG. 1B is a schematic diagram of an exemplary host system configured to perform storage compression based on a conventional storage-device-driven compression system.

Before discussing exemplary aspects of hardware-accelerated storage compression that include specific aspects of the present disclosure, a brief overview of a conventional software-based compression system and a conventional storage-device-driven compression system are provided with reference to FIGS. 1A and 1B, respectively. The discussion of specific exemplary aspects of hardware accelerated storage compression starts with reference to FIG. 2. The discussion of specific exemplary aspects of requesting storage device access via HCI starts with reference to FIG. 8.

In this regard, FIG. 1A is a schematic diagram of an exemplary host system 100 configured to perform storage compression based on a conventional software-based compression system.

The host system 100 includes a storage controller 102 configured to enable read/write access to a storage device 104 coupled to the host system 100. The host system 100 also includes a control system 106 that is configured to provide data access to applications running in the host system 100. When an application requests to write a data file (not shown) to the storage device 104, the control system 106 first generates an indexed-node (inode) (not shown) to store related metadata (e.g., file name, file owner, file access permission, etc.).

Prior to writing the data file to the storage device 104, a software compression engine 108 compresses the data file to save storage space in the storage device 104. In a non-limiting example, the software compression engine 108 (e.g., WinZip) may compress the data file in to a single compressed data file 110. In another non-limiting example, the software compression engine 108 may compress the data file into a plurality of compressed data blocks 112. Each of the plurality of compressed data blocks 112 may be one hundred and twenty-eight kilobytes (128 KB) in size. Subsequently, the storage controller 102 writes the single compressed data file 110 or the plurality of compressed data blocks 112 to the storage device 104. In a non-limiting example, the storage device 104 may include storage data blocks that are four kilobytes (4 KB) in size. As such, the single compressed data file 110 or the plurality of compressed data blocks 112 may occupy multiple storage data blocks.

With continuing reference to FIG. 1A, when the application needs to access the data file stored in the storage device 104, the storage controller 102 reads the single compressed data file 110 or the plurality of compressed data blocks 112 from the storage device 104. The control system 106 then decompresses the single compressed data file 110 or the plurality of compressed data blocks 112 for the application.

The conventional software-based compression system carries significant processing delays due to compression/decompression processes performed by the software compression engine 108. Furthermore, because the conventional software-based compression system compresses the data file into either the single compressed data file 110 or the plurality of compressed data blocks 112 that are 128 KB in size, the control system 106 must read and decompress the single compressed data file 110 or a 128 KB compressed data block among the plurality of compressed data blocks 112 even if the application only requests to read a small portion (e.g. 4 KB) of the data file. As a result, the conventional software-based compression system also carries significant processing overhead.

As an alternative to performing data compression/decompression in the host system 100, it is also possible to perform the data compression/decompression in the storage device 104. In this regard, FIG. 1B is a schematic diagram of an exemplary host system 100(1) configured to perform storage compression based on a conventional storage-device-driven compression system.

With reference to FIG. 1B, The host system 100(1) includes a storage controller 102(1) configured to enable read/write access to a storage device 104(1) coupled to the host system 100(1). The host system 100(1) also includes a control system 106(1) that is configured to provide data access to applications running in the host system 100(1). The storage device 104(1) includes a compression engine 114 configured to support the conventional storage-device-driven compression system.

When an application requests to write an uncompressed data file 116 to the storage device 104(1), the storage controller 102(1) sends the uncompressed data file 116 to the storage device 104(1). Prior to writing the uncompressed data file 116 into storage data blocks (not shown) in the storage device 104(1), the compression engine 114 compresses the uncompressed data file 116 into a plurality of compressed data blocks (not shown) based on compression algorithms that are typically unknown to the host system 100(1). In other words, the host system 100(1) has no knowledge or control over how the compression is performed by the compression engine 114.

When the application requests to read the uncompressed data file 116 from the storage device 104(1), the compression engine 114 decompresses the plurality of compressed data blocks corresponding to the uncompressed data file 116 and provides the uncompressed data file 116 back to the host system 100(1). As such, the control system 106(1) also has no control over how the compression engine 114 compresses the uncompressed data file 116.

As discussed above in FIGS. 1A and 1B, the conventional software-based compression system and the conventional storage-device-driven compression system both have obvious drawbacks. The conventional software-based compression system incurs processing delays and processing overhead while the conventional storage-device-driven compression system gives no control to the host system. Hence, it may be desirable to have a compression system that can reduce the processing delays and processing overhead associated with the conventional software-based compression system while improving compression control over the conventional storage-device-driven compression system.

Figure 2:
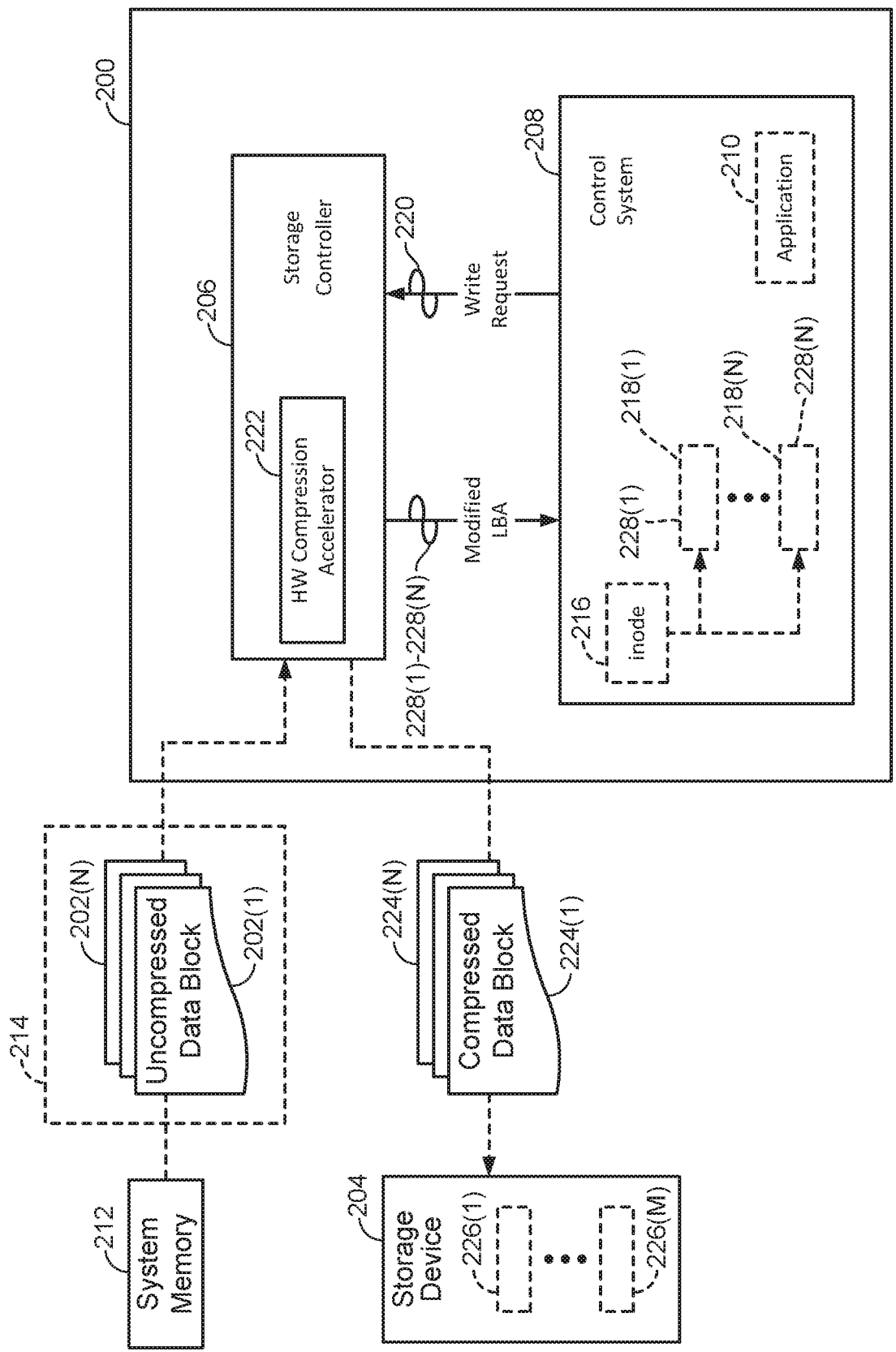
FIG. 2 is a schematic diagram of an exemplary host system configured to write one or more uncompressed data blocks to a storage device based on a hardware-accelerated storage compression system.

In this regard, FIG. 2 is a schematic diagram of an exemplary host system 200 configured to write one or more uncompressed data blocks 202(1)-202(N) to a storage device 204 based on a hardware-accelerated storage compression system.

The host system 200 includes a storage controller 206 configured to enable read/write access to the storage device 204. In a non-limiting example, the storage device 204 may be a hard-disk drive (HDD), a solid-state disk (SSD), an embedded multimedia card (eMMC), a universal flash storage (UFS), and/or a universal serial bus (USB) storage device. In another non-limiting example, the storage device 204 may be embedded in the host system 200 or coupled externally to the host system 200. The host system 200 also includes a control system 208, which may be an operating system (OS) and/or file system (FS) for example, that is configured to provide data access to an application 210 running in the host system 200. In a non-limiting example, the OS may be Android, iOS, Windows, Linux, and/or Unix.

When the application 210 is running in the host system 200, the application 210 may generate and temporarily store the one or more uncompressed data blocks 202(1)-202(N) in a system memory 212, for example. In a non-limiting example, the system memory 212 may be a dynamic random access memory (DRAM). When the application 210 needs to store permanently the one or more uncompressed data blocks 202(1)-202(N) in form of a data file 214, the control system 208 generates an mode 216 to store metadata related to the data file 214 and the one or more uncompressed data blocks 202(1)-202(N). In a non-limiting example, the mode 216 is provided as a data structure and contains such metadata (e.g., file name, file owner, file access permission, etc.) that defines the data file 214. The mode 216 also contains an LBA pointer (not shown) that points to one or more LBAs 218(1)-218(N) associated with the one or more uncompressed data blocks 202(1)-202(N), respectively. The one or more LBAs 218(1)-218(N) may be used by the control system 208 to locate the one or more uncompressed data blocks 202(1)-202(N) in the data file 214. In a non-limiting example, each of the one or more LBAs 218(1)-218(N) has a respective length of thirty-two bits that can address two to the power of thirty-two ($2^{32}$) data blocks. The structure and content of the mode 216 is further illustrated and discussed with reference to FIG. 3.

Subsequent to defining the data file 214 in the mode 216, the control system 208 sends a write request 220 to the storage controller 206 to write the one or more uncompressed data blocks 202(1)-202(N) to the storage device 204. The storage controller 206 includes a hardware compression accelerator 222 configured to support the hardware-accelerated storage compression system. The hardware compression accelerator 222 compresses the one or more uncompressed data blocks 202(1)-202(N) to generate one or more compressed data blocks 224(1)-224(N), respectively. According to a non-limiting example, the hardware compression accelerator 222 is configured to compress each of the one or more uncompressed data blocks 202(1)-202(N) individually. As a result, respective sizes of the one or more compressed data blocks 224(1)-224(N) will be no larger than respective sizes of the one or more uncompressed data blocks 202(1)-202(N).

Although the hardware compression accelerator 222 is configured to compress each of the one or more uncompressed data blocks 202(1)-202(N) using the same compression algorithm, the one or more compressed data blocks 224(1)-224(N) may not be the same size. For example, if each of the one or more uncompressed data blocks 202(1)-202(N) is 4 KB in size, each of the one or more compressed data blocks 224(1)-224(N) can be any size that is less than or equal to 4 KB. Accordingly, if a compressed data block among the one or more compressed data blocks 224(1)-224(N) is still 4 KB in size after being compressed by the hardware compression accelerator 222, the compressed data block is in fact uncompressed. As such, it is possible for the hardware compression accelerator 222 to determine whether a compressed data block among the one or more compressed data blocks 224(1)-224(N) is compressed or uncompressed by comparing the respective size of the compressed data block against the respective size of the uncompressed data block among the one or more uncompressed data blocks 202(1)-202(N).

With continuing reference to FIG. 2, the hardware compression accelerator 222 is further configured to allocate each of the one or more compressed data blocks 224(1)-224(N) to one or more storage data blocks 226(1)-226(M) in the storage device 204. In a non-limiting example, each of the one or more storage data blocks 226(1)-226(M) is 4 KB in size. Since the one or more compressed data blocks 224(1)-224(N) can be any size that is less than or equal to 4 KB, it may be possible for the hardware compression accelerator 222 to co-locate a compressed data block among the one or more compressed data blocks 224(1)-224(N) with at least one other compressed data block among the one or more compressed data blocks 224(1)-224(N) in a storage data block among the one or more storage data blocks 226(1)-226(M). As a result, the hardware compression accelerator 222 may store the one or more compressed data blocks 224(1)-224(N) in fewer of the storage data blocks 226(1)-226(M), thus conserving storage space in the storage device 204. A more detailed discussion with respect to storage data block allocation is provided later with reference to FIG. 4.

Subsequently, the storage controller 206 is configured to write the one or more compressed data blocks 224(1)-224(N) to the one or more storage data blocks 226(1)-226(M). To help the control system 208 locate the one or more compressed data blocks 224(1)-224(N) based on the one or more LBAs 218(1)-218(N), the hardware compression accelerator 222 generates and provides one or more modified LBAs 228(1)-228(N) to the control system 208. The one or more modified LBAs 228(1)-228(N) are configured to correlate the one or more LBAs 218(1)-218(N) with the one or more compressed data blocks 224(1)-224(N), respectively. The control system 208 receives the one or more modified LBAs 228(1)-228(N) and stores the one or more modified LBAs 228(1)-228(N) in the inode 216 in correlation with the one or more LBAs 218(1)-218(N), respectively. As illustrated next with reference to FIGS. 3 and 4, the one or more modified LBAs 228(1)-228(N) effectively correlate the one or more uncompressed data blocks 202(1)-202(N) with the one or more compressed data blocks 224(1)-224(N).

Figure 3:
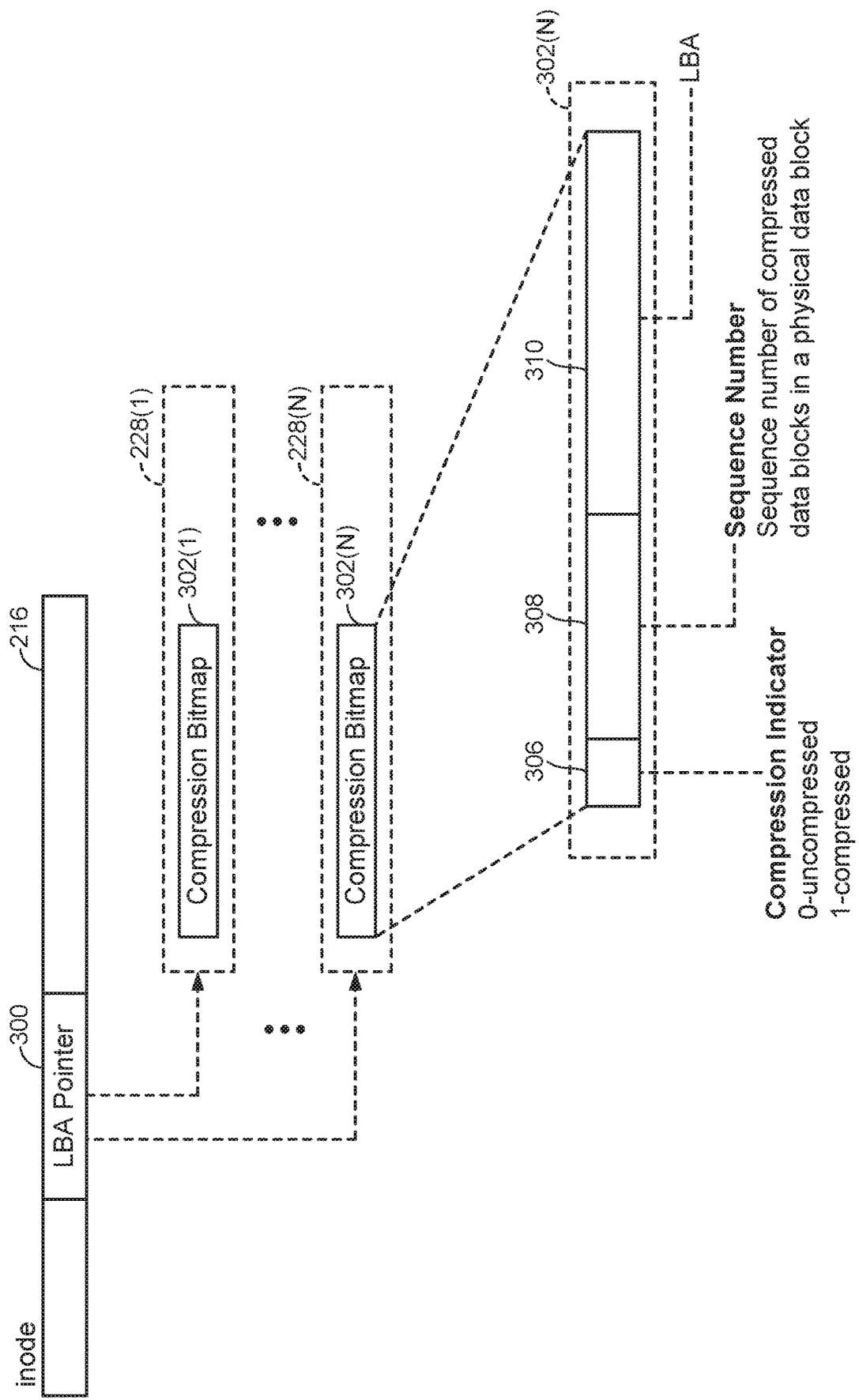
FIG. 3 is a schematic diagram providing an exemplary illustration of an indexed-node (inode) that contains one or more modified logical block addresses (LBAs) configured to link the one or more uncompressed data blocks of FIG. 2 with one or more compressed data blocks, respectively.

In this regard, FIG. 3 is a schematic diagram providing an exemplary illustration of the inode 216 of FIG. 2 that contains the one or more modified LBAs 228(1)-228(N) configured to correlate the one or more uncompressed data blocks 202(1)-202(N) with the one or more compressed data blocks 224(1)-224(N), respectively. Elements of FIG. 2 are referenced in connection with FIG. 3 and will not be re-described herein.

With reference to FIG. 3, the inode 216 includes an LBA pointer 300 that points to the one or more modified LBAs 228(1)-228(N). The one or more modified LBAs 228(1)-228(N) comprise one or more compression bitmaps 302(1)-302(N), respectively.

For the convenience of illustration, compression bitmap 302(N) in modified LBA 228(N) is discussed herein as a non-limiting example. It should be understood that the illustrations provided herein with references to the compression bitmap 302(N), the modified LBA 228(N), LBA 218(N) of FIG. 2, uncompressed data block 202(N) of FIG. 2, and compressed data block 224(N) of FIG. 2 are applicable to all of the one or more compression bitmaps 302(1)-302(N).

With continuing reference to FIG. 3, the compression bitmap 302(N) includes a compression indicator 306, a sequence number 308, and an LBA number 310. In a non-limiting example, the compression indicator 306 is one bit (1-bit) in length. The hardware compression accelerator 222 sets the compression indicator 306 to one (1) if the uncompressed data block 202(N) is compressed and to zero (0) if the uncompressed data block 202(N) is uncompressed. To determine whether the uncompressed data block 202(N) is compressed or uncompressed, the hardware compression accelerator 222 of FIG. 2 is configured to compare the respective size of the compressed data block 224(N) and the respective size of the uncompressed data block 202(N). If the respective size of the compressed data block 224(N) is less than the respective size of the uncompressed data block 202(N), the uncompressed data block 202(N) is deemed to be compressed and the hardware compression accelerator 222 sets the compression indicator 306 to 1. In contrast, if the respective size of the compressed data block 224(N) is equal to the respective size of the uncompressed data block 202(N), the uncompressed data block 202(N) is deemed to be uncompressed and the hardware compression accelerator 222 sets the compression indicator 306 to 0.

As previously discussed with reference to FIG. 2, it may be possible to co-locate a compressed data block among the one or more compressed data blocks 224(1)-224(N) with at least one other compressed data block among the one or more compressed data blocks 224(1)-224(N) in a storage data block among the one or more storage data blocks 226(1)-226(M). In a non-limiting example, a predetermined allocation limit may be pre-programmed in the hardware compression accelerator 222 to define a maximum number of compressed data blocks that can be co-located by the hardware compression accelerator 222 in each of the one or more storage data blocks 226(1)-226(M). As such, the sequence number 308 is configured to indicate relative sequence of the compressed data block 224(N) in the storage data block if the compressed data block 224(N) is co-located with the at least one other compressed data block among the one or more compressed data blocks 224(1)-224(N). The number of bits in the sequence number 308 (sometimes referred to as $N_{BIT}$) can be determined based on the predetermined allocation limit in equation Eq. 1 below.

$$N_{BIT}=\lceil \log_2(\text{Predetermined Allocation Limit})\rceil \quad (\text{Eq. 1})$$

The LBA number 310 is configured to indicate the LBA 218(N) that corresponds to the modified LBA 228(N) in the inode 216. In a non-limiting example, the LBA number 310 may be expressed in hexadecimal format.

Figure 4:
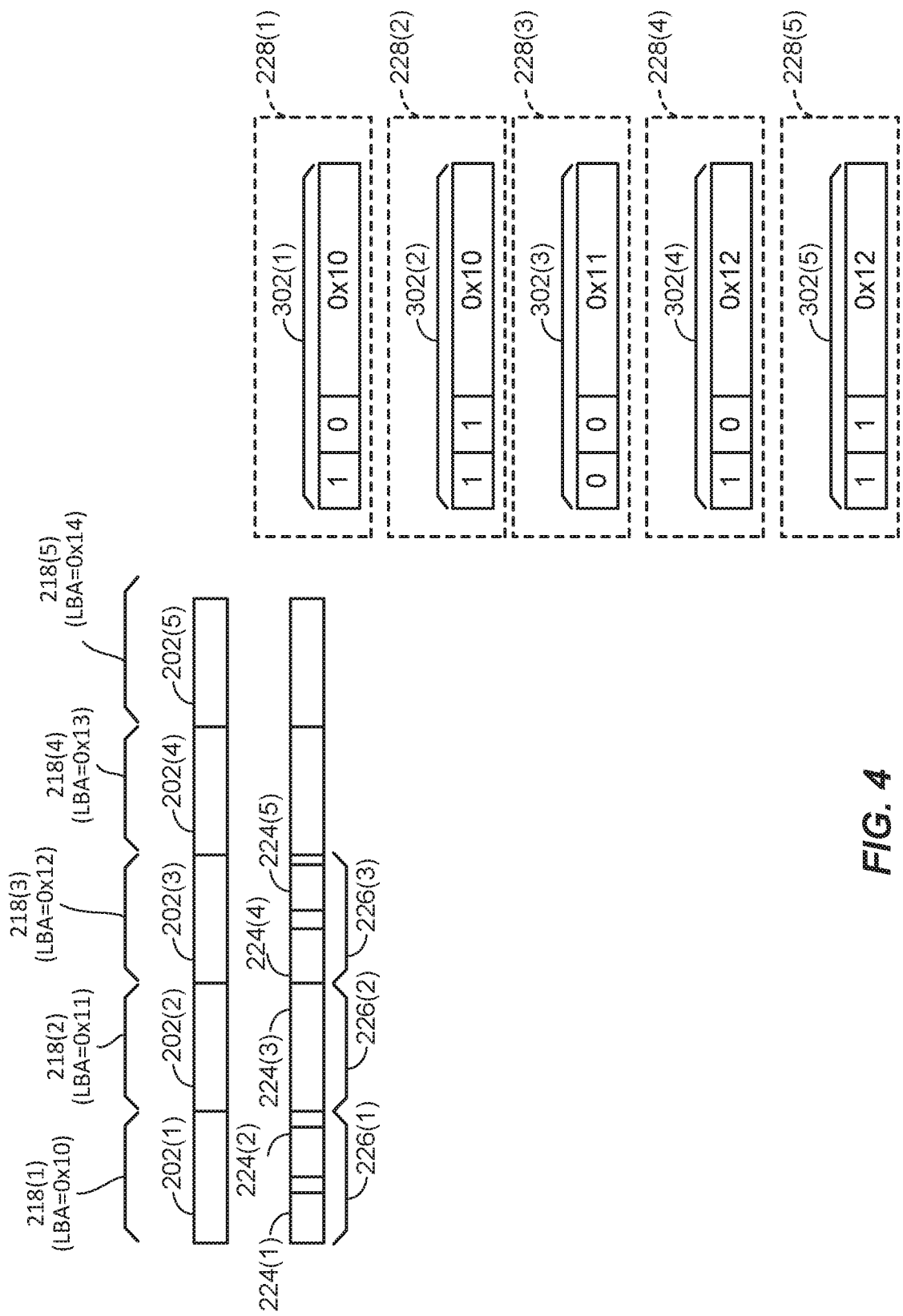
FIG. 4 is a schematic diagram providing an exemplary illustration of correlations between uncompressed data blocks, compressed data blocks, modified LBAs, and LBAs.

To help further understand how the one or more compression bitmaps 302(1)-302(N) can correlate the one or more uncompressed data blocks 202(1)-202(N) of FIG. 2 with the one or more compressed data blocks 224(1)-224(N), FIG. 4 is provided next. For the purpose of clarity and convenience, uncompressed data blocks 202(1)-202(5), compressed data blocks 224(1)-224(5), modified LBAs 228(1)-228(5), and LBAs 218(1)-218(5) are illustrated and discussed herein as non-limiting examples.

In this regard, FIG. 4 is a schematic diagram providing an exemplary illustration of correlations between the uncompressed data blocks 202(1)-202(5), the compressed data blocks 224(1)-224(5), the modified LBAs 228(1)-228(5), and the LBAs 218(1)-218(5). Common elements between FIGS. 2, 3, and 4 are shown therein with common element numbers and will not be re-described herein.

As illustrated in FIG. 4, in a non-limiting example, the LBAs 218(1)-218(5) have respective values of hexadecimal ten (0x10), hexadecimal eleven (0x11), hexadecimal twelve (0x12), hexadecimal thirteen (0x13), and hexadecimal fourteen (0x14).

With reference to FIG. 4, the compressed data block 224(1) is co-located with the compressed data block 224(2) in the storage data block 226(1). The hardware compression accelerator 222 of FIG. 2 determines whether the compressed data block 224(1) can be co-located with the compressed data block 224(2) based on two tests. The first test is to make sure that total size of the compressed data block 224(1) and the compressed data block 224(2) is less than or equal to the size of the storage data block 226(1), which is 4 KB according to the non-limiting example provided with reference to FIG. 2. In this regard, if the first test is passed, the compressed data blocks 224(1)-224(2) are smaller in size than the uncompressed data blocks 202(1)-202(2), respectively.

With continuing reference to FIG. 4, the second test is to make sure that total number of the compressed data block 224(1) and the compressed data block 224(2) is less than or equal to the predetermined allocation limit that defines the total number of compressed data blocks that can be allocated per storage data block. If the predetermined allocation limit is set to two, for example, the compressed data block 224(1) and the compressed data block 224(2) will pass the second test.

In this regard, in compression bitmap 302(1), the compression indicator 306 is set to 1 by the hardware compression accelerator 222 to indicate that the uncompressed data block 202(1) is compressed. The sequence number 308 is set to 0 to indicate that the compressed data block 224(1) is the first compressed data block in the storage data block 226(1). The LBA number 310 is set to 0x10, which indicates the LBA value of the uncompressed data block 202(1), by the hardware compression accelerator 222. Accordingly, the modified LBA 228(1), the uncompressed data block 202(1), and the compressed data block 224(1) become correlated to each other.

In compression bitmap 302(2), the compression indicator 306 is set to 1 to indicate that the uncompressed data block 202(2) is compressed. The sequence number 308 is set to 1 by the hardware compression accelerator 222 to indicate that the compressed data block 224(2) is the second compressed data block in the storage data block 226(1). The LBA number 310 is set to 0x10, which indicates the LBA value of the uncompressed data block 202(2), by the hardware compression accelerator 222.

With continuing reference to FIG. 4, the compressed data block 224(3) is allocated to the storage data block 226(2) alone. As illustrated, the size of the compressed data block 224(3) is the same as the uncompressed data block 202(3). According to previous discussion with reference to FIG. 2, the uncompressed data block 202(3) remains uncompressed after being compressed by the hardware compression accelerator 222. In this regard, in compression bitmap 302(3), the compression indicator 306 is set to 0 by the hardware compression accelerator 222 to indicate that the uncompressed data block 202(3) remains uncompressed. The sequence number 308 is set to 0 to indicate that the compressed data block 224(3) is the first compressed data block in the storage data block 226(2). The LBA block number 310 is set to 0x11, which is the LBA value of the uncompressed data block 202(3), by the hardware compression accelerator 222.

With continuing reference to FIG. 4, the compressed data blocks 224(4)-224(5) are co-located to the storage data block 226(3). As such, in compression bitmap 302(4), the compression indicator 306 is set to 1 by the hardware compression accelerator 222 to indicate that the uncompressed data block 202(4) is compressed. The sequence number 308 is set to 0 to indicate that the compressed data block 224(4) is the first compressed data block in the storage data block 226(3). The LBA block number 310 is set to 0x12, which is the LBA value of the uncompressed data block 202(4), by the hardware compression accelerator 222.

In compression bitmap 302(5), the compression indicator 306 is set to 1 to indicate that the uncompressed data block 202(5) is compressed. The sequence number 308 is set to 1 by the hardware compression accelerator 222 to indicate that the compressed data block 224(5) is the second compressed data block in the storage data block 226(3). The LBA number 310 is also set to 0x12, which is the LBA value of the uncompressed data block 202(5), by the hardware compression accelerator 222.

Figure 5:
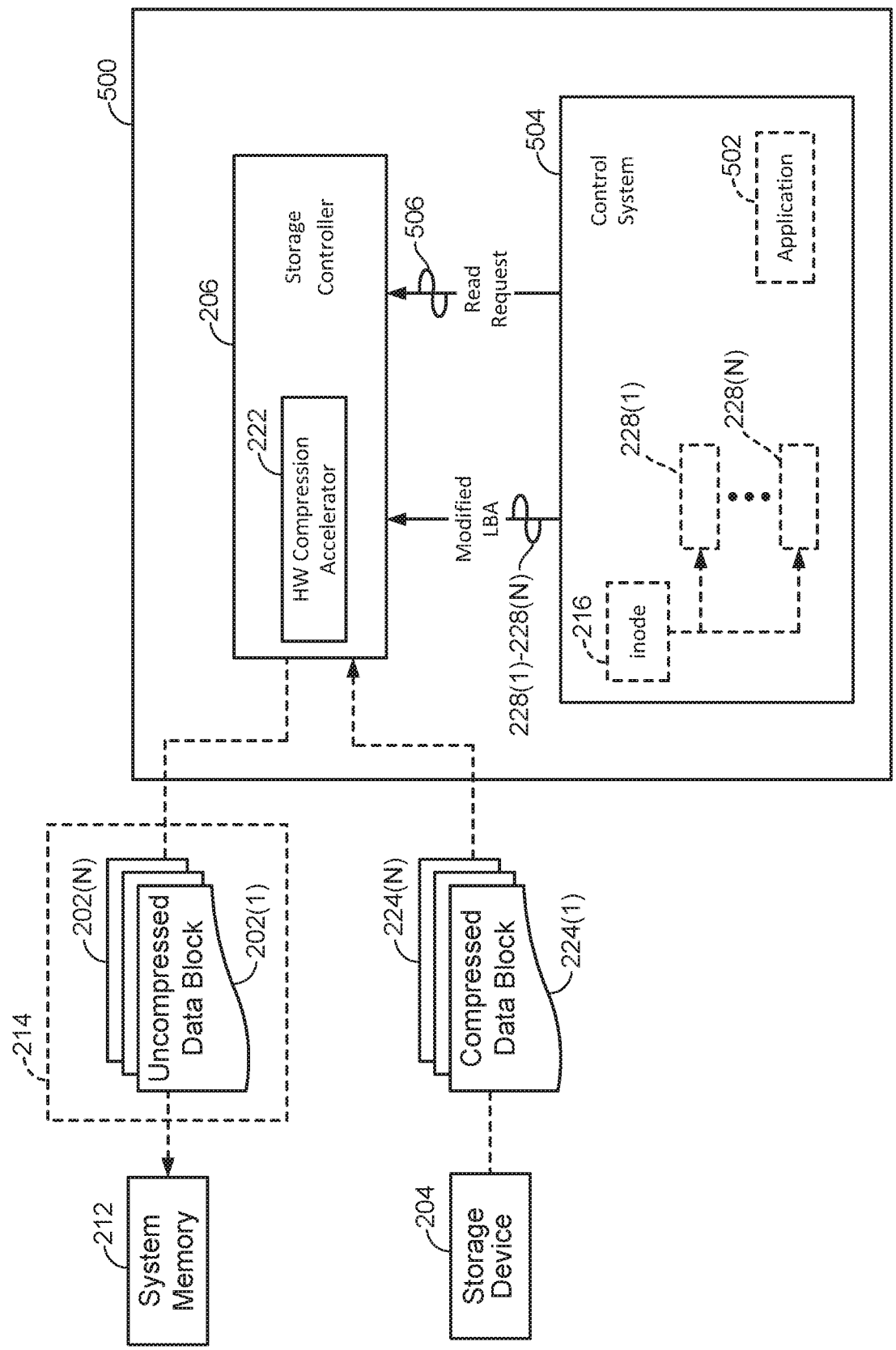
FIG. 5 is a schematic diagram of an exemplary host system configured to read one or more uncompressed data blocks that are generated based on the hardware-accelerated compression system of FIG. 2 from the storage device.

As previously discussed with reference to FIG. 2, the hardware compression accelerator 222 generates the one or more modified LBAs 228(1)-228(N) to help the control system 208 locate the one or more compressed data blocks 224(1)-224(N). As such, it is possible for the control system 208 to read the one or more compressed data blocks 224(1)-224(N) from the storage device 204 based on the one or more modified LBAs 228(1)-228(N) stored in the inode 216. In this regard, FIG. 5 is a schematic diagram of an exemplary host system 500 configured to read the one or more uncompressed data blocks 202(1)-202(N) of FIG. 2 from the storage device 204 based on the one or more modified LBAs 228(1)-228(N), respectively. Common elements between FIGS. 2 and 5 are shown therein with common element numbers and will not be re-described herein.

With reference to FIG. 5, when an application 502 needs to read the data file 214 that includes the one or more uncompressed data blocks 202(1)-202(N) from the storage device 204, a control system 504 provides a read request 506, together with the one or more modified LBAs 228(1)-228(N), to the storage controller 206. According to previous discussion with reference to FIGS. 2-4, the one or more modified LBAs 228(1)-228(N) correlate the one or more uncompressed data blocks 202(1)-202(N) with the one or more compressed data blocks 224(1)-224(N). As such, the storage controller 206 retrieves the one or more compressed data blocks 224(1)-224(N) from the storage device 204. The hardware compression accelerator 222 decompresses the one or more compressed data blocks 224(1)-224(N) to the one or more uncompressed data blocks 202(1)-202(N), respectively. In a non-limiting example, the one or more uncompressed data blocks 202(1)-202(N) are stored in the system memory 212 for access by the application 502.

Figure 6:
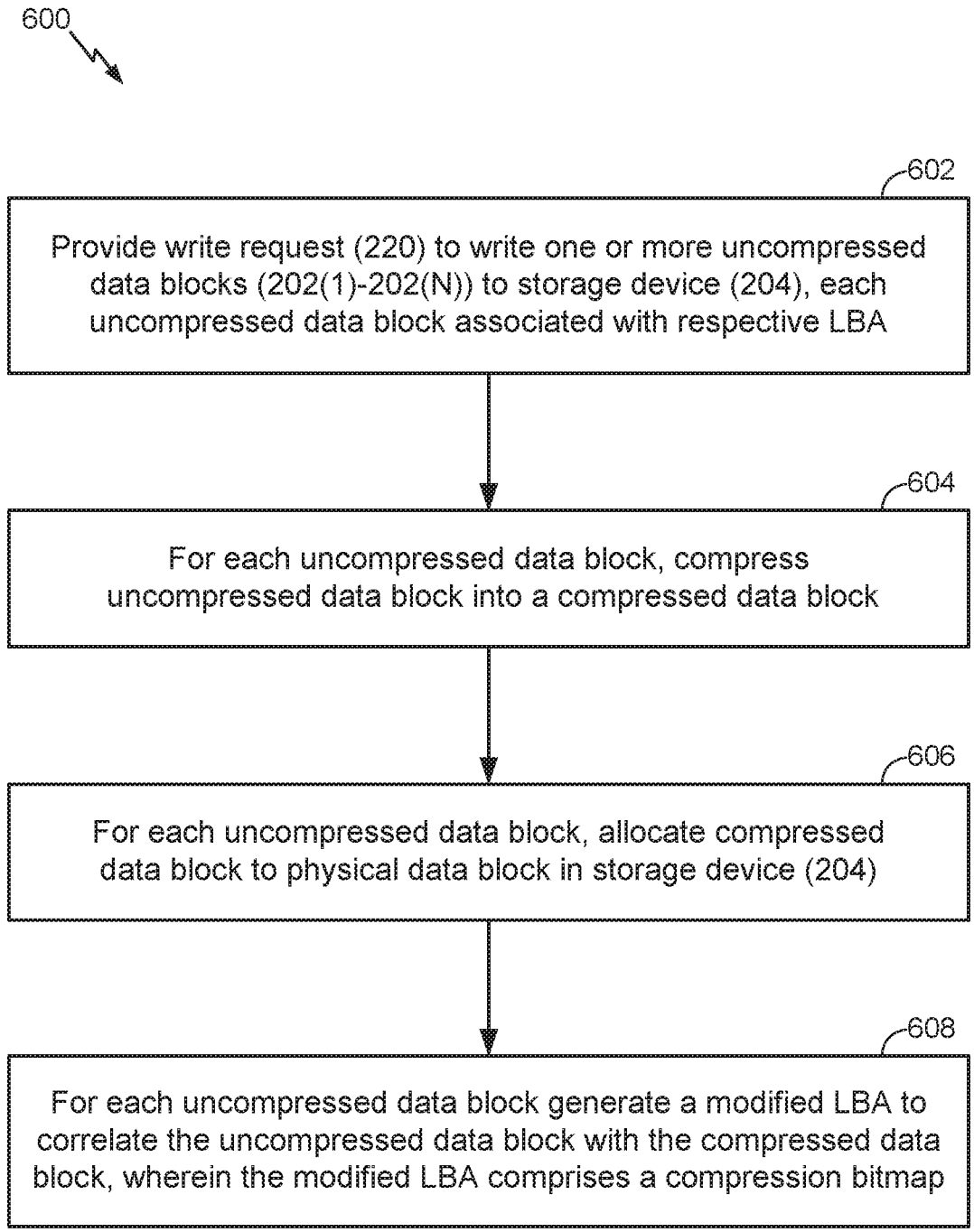
FIG. 6 is a flowchart of an exemplary write process for writing the one or more uncompressed data blocks of FIG. 2 to the storage device under the hardware-accelerated compression system.

FIG. 6 is a flowchart of an exemplary write process 600 for writing the one or more uncompressed data blocks 202(1)-202(N) of FIG. 2 to the storage device 204 under the hardware-accelerated compression system. Elements of FIG. 2 are referenced in connection with FIG. 6 and will not be re-described herein.

According to the write process 600, the control system 208 provides the write request 220 to write the one or more uncompressed data blocks 202(1)-202(N) to the storage device 204, in which each of the one or more uncompressed data blocks 202(1)-202(N) is associated with a respective LBA among the one or more LBAs 218(1)-218(N) (block 602). For each uncompressed data block among the one or more uncompressed data blocks 202(1)-202(N), the hardware compression accelerator 222 compresses the uncompressed data block into a compressed data block (block 604). Subsequently, for each uncompressed data block among the one or more uncompressed data blocks 202(1)-202(N), the hardware compression accelerator 222 allocates the compressed data block to a storage data block in the storage device 204 (block 606). Then, for each uncompressed data block among the one or more uncompressed data blocks 202(1)-202(N), the hardware compression accelerator 222 generates a modified LBA to correlate the uncompressed data block with the compressed data block, wherein the modified LBA comprises a compression bitmap (block 608). The compression bitmap as discussed in the foregoing may include a compression indicator, a sequence number and an LBA number. The compression indicator is configured to indicate whether the respective compressed data block is compressed. The sequence number is configured to indicate relative sequence of the respective compressed data block in a storage data block in which the respective compressed data block is stored. The LBA number configured to indicate the respective LBA of the uncompressed data block corresponding to the respective compressed data block.

Figure 7:
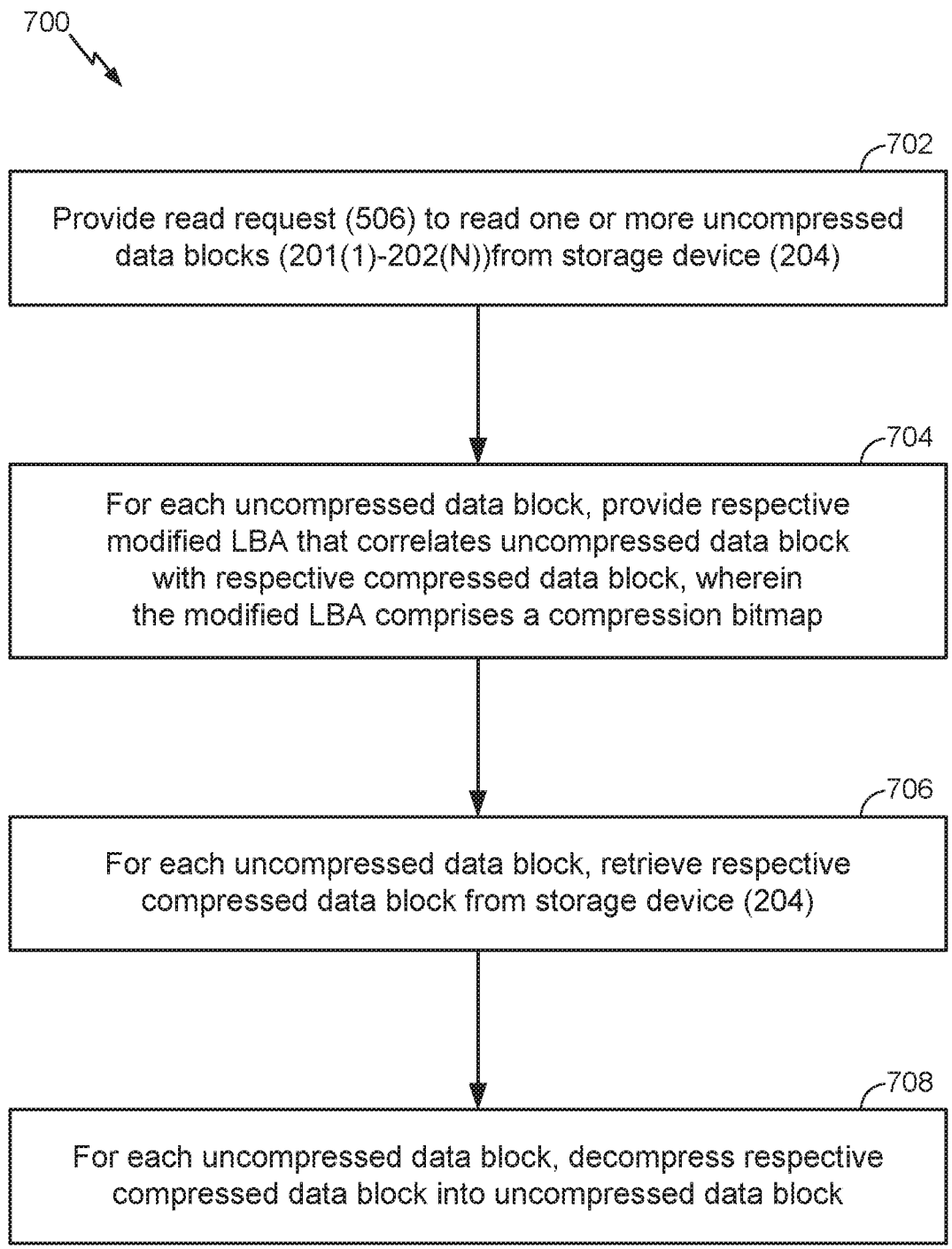
FIG. 7 is a flowchart of an exemplary read process for reading the one or more uncompressed data blocks of FIG. 5 under the hardware-accelerated compression system.

FIG. 7 is a flowchart of an exemplary read process 700 for reading the one or more uncompressed data blocks 202(1)-202(N) of FIG. 5 from the storage device 204 under the hardware-accelerated compression system. Elements of FIG. 5 are referenced in connection with FIG. 7 and will not be re-described herein.

According to the read process 700, the control system 504 provides the read request 506 to read the one or more uncompressed data blocks 202(1)-202(N) from the storage device 204 (block 702). For each uncompressed data block among the one or more uncompressed data blocks 202(1)-202(N), the control system 504 provides a respective modified LBA that correlates the uncompressed data block with a respective compressed data block, wherein the modified LBA comprises a compression bitmap (block 704). As discussed above, the compression bitmap may include a compression indicator, a sequence number and an LBA number. The compression indicator is configured to indicate whether the respective compressed data block is compressed. The sequence number is configured to indicate relative sequence of the respective compressed data block in a storage data block in which the respective compressed data block is stored. The LBA number configured to indicate the respective LBA of the uncompressed data block corresponding to the respective compressed data block.

Subsequently, for each uncompressed data block among the one or more uncompressed data blocks 202(1)-202(N), the storage controller 206 retrieves the respective compressed data block from the storage device 204 (block 706). Then, for each uncompressed data block among the one or more uncompressed data blocks 202(1)-202(N), the hardware compression accelerator 222 decompresses the respective compressed data block into the uncompressed data block (block 708).

Figure 8:
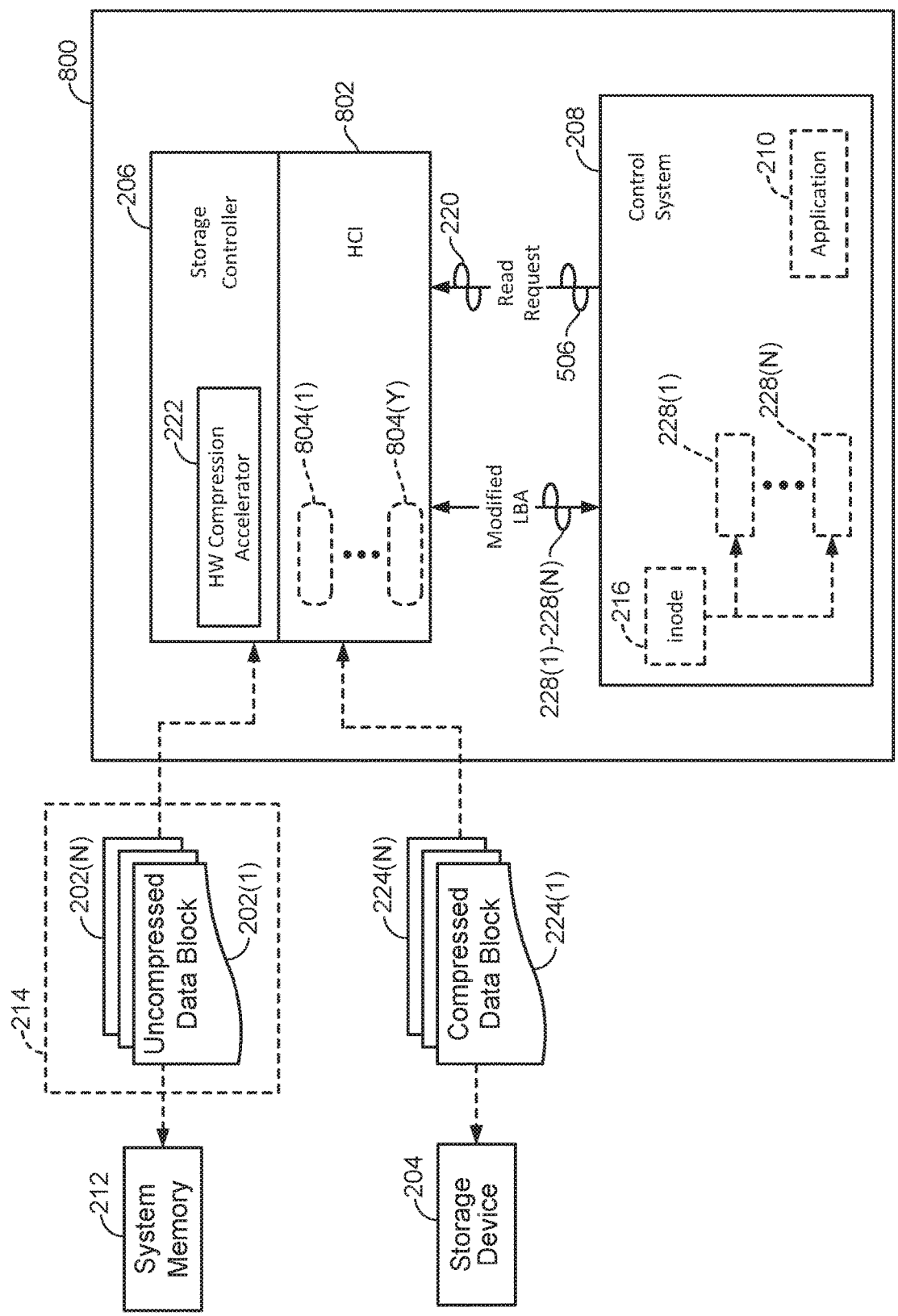
FIG. 8 is a schematic diagram of an exemplary host system in which a control system is configured to communicate with a storage controller via a host controller interface (HCI)

According to previous discussions with reference to FIGS. 2 and 5, the control system 208 sends the write request 220 or the read request 506 to the storage controller 206 to write the one or more uncompressed data blocks 202(1)-202(N) to the storage device 204 or to read the one or more uncompressed data blocks 202(1)-202(N) from the storage device 204. In a non-limiting example, the write request 220 and the read request 506 can be provided from the control system 208 to the storage controller 206 via an HCI. In this regard, FIG. 8 is a schematic diagram of an exemplary host system 800 in which the control system 208 of FIGS. 2 and 5 is configured to communicate with the storage controller 206 via an HCI 802. Common elements between FIGS. 2, 5, and 8 are shown therein with common element numbers and will not be re-described herein.

With reference to FIG. 8, to request the storage controller 206 to write the one or more uncompressed data blocks 202(1)-202(N) to the storage device 204, the write request 220 carries such information as a write indication, a starting LBA of the one or more uncompressed data blocks 202(1)-202(N), and a total count of the one or more uncompressed data blocks 202(1)-202(N). Likewise, the read request 506 carries a read indication, the starting LBA of the one or more uncompressed data blocks 202(1)-202(N), and the total count of the one or more uncompressed data blocks 202(1)-202(N). The write request 220 and the read request 506 may be provided using standard HCI data structures that are further illustrated and discussed with reference to FIGS. 9A and 9B.

With continuing reference to FIG. 8, the hardware compression accelerator 222 compresses the one or more uncompressed data blocks 202(1)-202(N) and decompresses the one or more compressed data blocks 224(1)-224(N) based on a compression algorithm. To define compression algorithms that may be employed by the hardware compression accelerator 222, a plurality of compression configuration registers 804(1)-804(Y) is provided in the HCI 802. Each of the plurality of compression configuration registers 804(1)-804(Y) defines a respective compression algorithm that may be employed by the hardware compression accelerator 222. In a non-limiting example, the compression algorithms defined in the plurality of compression configuration registers 804(1)-804(Y) may include run-length encoding (RLE), Lempei-Ziv encoding (LZ), Huffman encoding (Huffman), LZ plus Huffman dictionary zero, LZ plus Huffman dictionary one, and so on. The compression algorithm may be determined by the control system 208 and communicated to the storage controller 206 in the write request 220 or the read request 506. Further discussion on communicating the compression algorithm using standard HCI data structures is provided later with reference to FIGS. 10A and 10B.

Figure 9A:
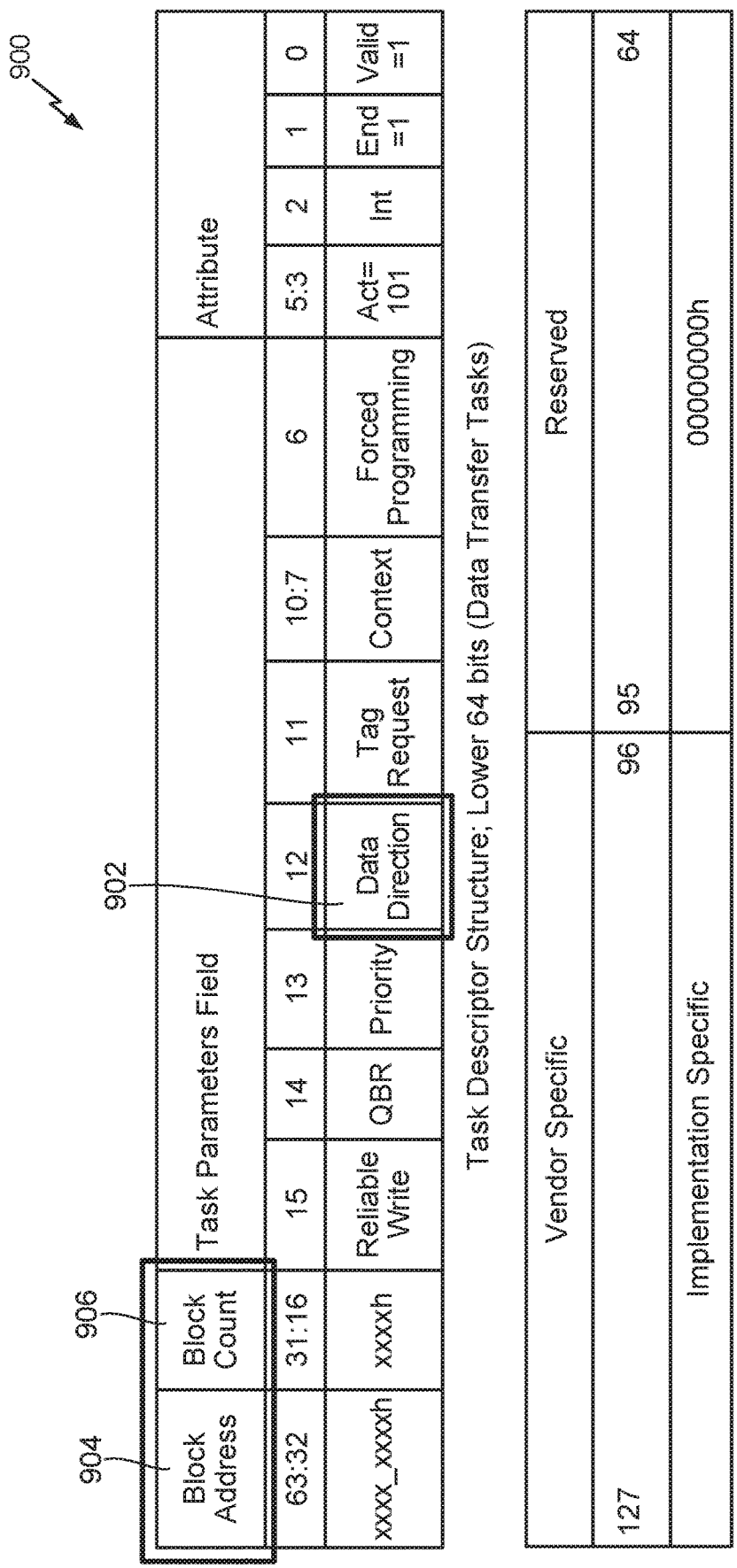
FIG. 9A is a schematic diagram of an exemplary embedded multimedia card (eMMC) HCI data structure that can be configured to provide read/write requests from the control system of FIG. 8 to the storage controller of FIG. 8.

As previously discussed in FIG. 2, the storage device 204 may be an eMMC. In this regard, FIG. 9A is a schematic diagram of an exemplary eMMC HCI data structure 900 that can be configured to provide the write request 220 and the read request 506 of FIG. 8 from the control system 208 to the storage controller 206. Elements of FIG. 8 are referenced in connection with FIG. 9A and will not be re-described herein.

With reference to FIG. 9A, the eMMC HCI data structure 900 includes a data direction field 902 configured to indicate either a write operation or a read operation. The eMMC HCI data structure 900 also includes a block address field 904 configured to indicate the starting LBA, which is the modified LBA 228(1) of the compressed data block 224(1), of the one or more compressed data blocks 224(1)-224(N). The eMMC HCI data structure 900 also includes a block count field 906 configured to indicate the total count, which is N, of the one or more compressed data blocks 224(1)-224(N). In this regard, the storage controller 206 is able to write the one or more compressed data blocks 224(1)-224(N) to the storage device 204 or read the one or more compressed data blocks 224(1)-224(N) from the storage device 204 based on information provided in the eMMC HCI data structure 900.

Figure 9B:
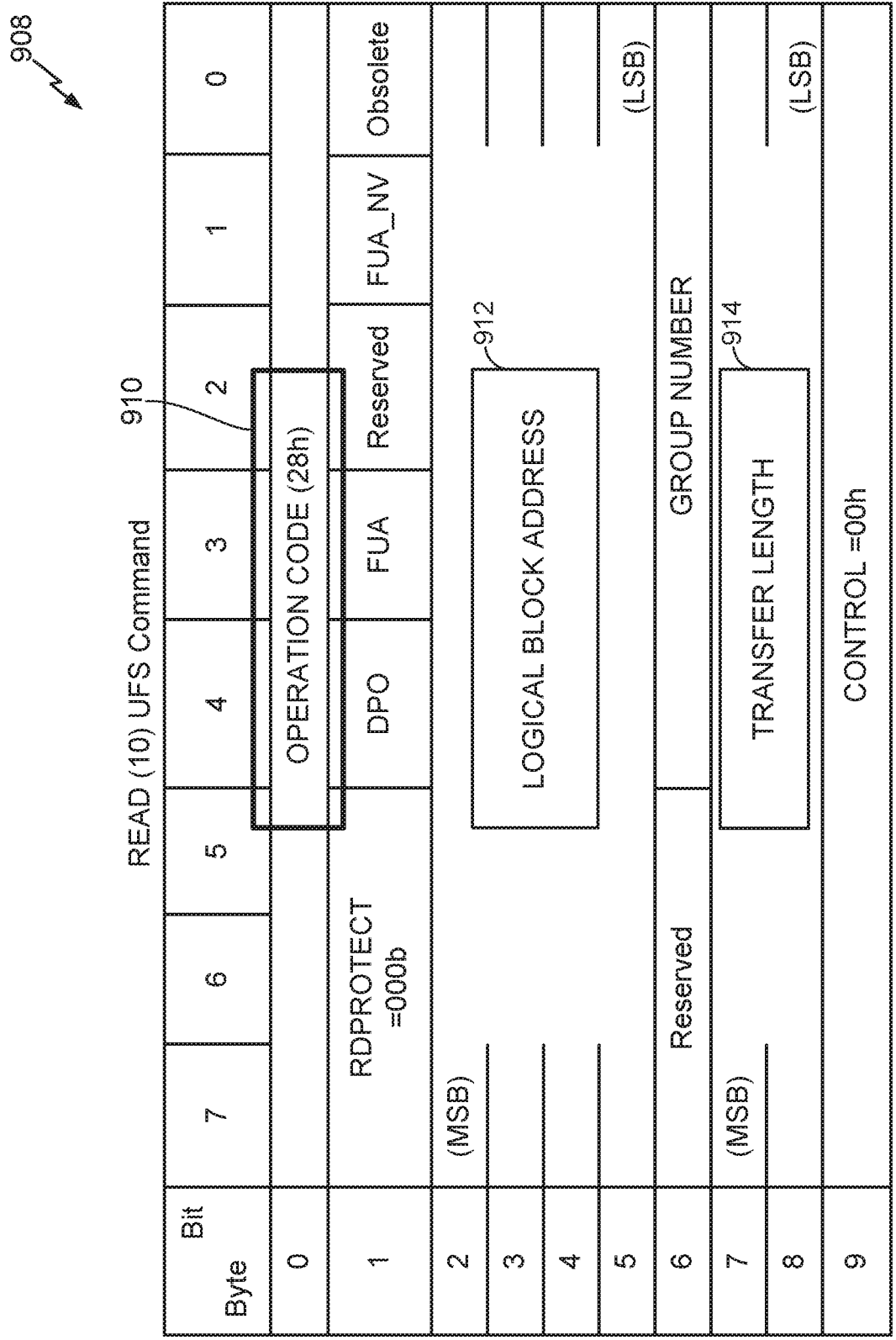
FIG. 9B is a schematic diagram of an exemplary universal flash storage (UFS) HCI data structure that can be configured to provide read/write requests from the control system of FIG. 8 to the storage controller of FIG. 8.

As previously discussed in FIG. 2, the storage device 204 may be a UFS. In this regard, FIG. 9B is a schematic diagram of an exemplary UFS HCI data structure 908 that can be configured to provide the write request 220 and the read request 506 of FIG. 8 from the control system 208 to the storage controller 206. Elements of FIG. 8 are referenced in connection with FIG. 9B and will not be re-described herein.

With reference to FIG. 9B, the UFS HCI data structure 908 includes an operation code field 910 configured to indicate either a write operation or a read operation. The UFS HCI data structure 908 also includes an LBA field 912 configured to indicate the starting LBA, which is the modified LBA 228(1) of the compressed data block 224(1), of the one or more compressed data blocks 224(1)-224(N). The UFS HCI data structure 908 also includes a transfer length field 914 configured to indicate the total count, which is N, of the one or more compressed data blocks 224(1)-224(N). In this regard, the storage controller 206 is able to write the one or more compressed data blocks 224(1)-224(N) to the storage device 204 or read the one or more compressed data blocks 224(1)-224(N) from the storage device 204 based on information provided in the UFS HCI data structure 908.

As discussed in FIG. 8, the compression algorithm may be determined by the control system 208 and communicated to the storage controller 206 in the write request 220 or the read request 506. In this regard, if the storage device 204 is an eMMC, FIG. 10A is a schematic diagram of an exemplary eMMC HCI data structure 1000 configured to define at least one compression algorithm for the hardware compression accelerator 222 of FIG. 8.

With reference to FIG. 10A, the eMMC HCI data structure 1000 is based on an eMMC task descriptor that includes a reserved data field 1002. The reserved data field 1002, which is sixty-four bits (64-bit) in length, for example, is reconfigured to communicate compression maps (not shown) between the control system 208 and the hardware compression accelerator 222. Each compression map includes a one-bit (1-bit) compression enable/disable indicator and an n-bit, in which n is a finite and positive integer, compression algorithm array index (CIDX) that points to one of the plurality of compression configuration registers 804(1)-804(Y). In this regard, the number of the compression maps that can be provided in the reserved data field 1002 may be determined based on equation Eq. 2 below.

If the eMMC HCI data structure 1000 is provided with the read request 506, the reserved data filed 1002 is configured to carry up to $N_{MAP}$ of the compression maps for up to $N_{MAP}$ of the uncompressed data blocks among the one or more uncompressed data blocks 202(1)-202(N). If the eMMC HCI data structure 1000 is provided with the write request 220, the reserved data field 1002 is set to 0. When the hardware compression accelerator 222 returns the one or more modified LBAs 228(1)-228(N), the reserved data field 1002 will be configured to carry up to $N_{MAP}$ of the compression maps for up to $N_{MAP}$ of the uncompressed data blocks among the one or more uncompressed data blocks 202(1)-202(N).

The storage device 204 may also be a UFS. In this regard, FIG. 10B is a schematic diagram of an exemplary UFS HCI data structure 1004 configured to define at least one compression algorithm for the hardware compression accelerator 222 of FIG. 8

With reference to FIG. 10B, the UFS HCI data structure 1004 is based on a UFS transfer request descriptor that includes a first reserved data field 1006 and a second reserved data field 1008. The first reserved data field 1006 and the second reserved data field 1008 are each thirty-two bits (32-bit) in length. In this regard, the first reserved data field 1006 and the second reserved data field 1008 form a reserved data field 1010 that is 64-bit in length.

The reserved data field 1010 is reconfigured to communicate the compression maps (not shown) between the control system 208 and the hardware compression accelerator 222. Each compression map includes the 1-bit compression enable/disable indicator and the n-bit, wherein n is a finite and positive integer, CIDX that points to one of the plurality of compression configuration registers 804(1)-804(Y). In this regard, the number of the compression maps that can be provided in the reserved data field 1010 may be determined based on the equation Eq. 2 above.

If the UFS HCI data structure 1004 is provided with the read request 506, the reserved data field 1010 is configured to carry up to $N_{MAP}$ of the compression maps for up to $N_{MAP}$ of the uncompressed data blocks among the one or more uncompressed data blocks 202(1)-202(N). If the UFS HCI data structure 1004 is provided with the write request 220, the reserved data field 1010 is set to 0. When the hardware compression accelerator 222 returns the one or more modified LBAs 228(1)-228(N), the reserved data field 1010 will be configured to carry up to $N_{MAP}$ of the compression maps for up to $N_{MAP}$ of the uncompressed data blocks among the one or more uncompressed data blocks 202(1)-202(N).

The host system 200 of FIG. 2, the host system 500 of FIG. 5, and the host system 800 of FIG. 8 may be provided in or integrated into any processor-based device. Examples, without limitation, include a set top box, an entertainment unit, a navigation device, a communications device, a fixed location data unit, a mobile location data unit, a mobile phone, a cellular phone, a smartphone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 11:
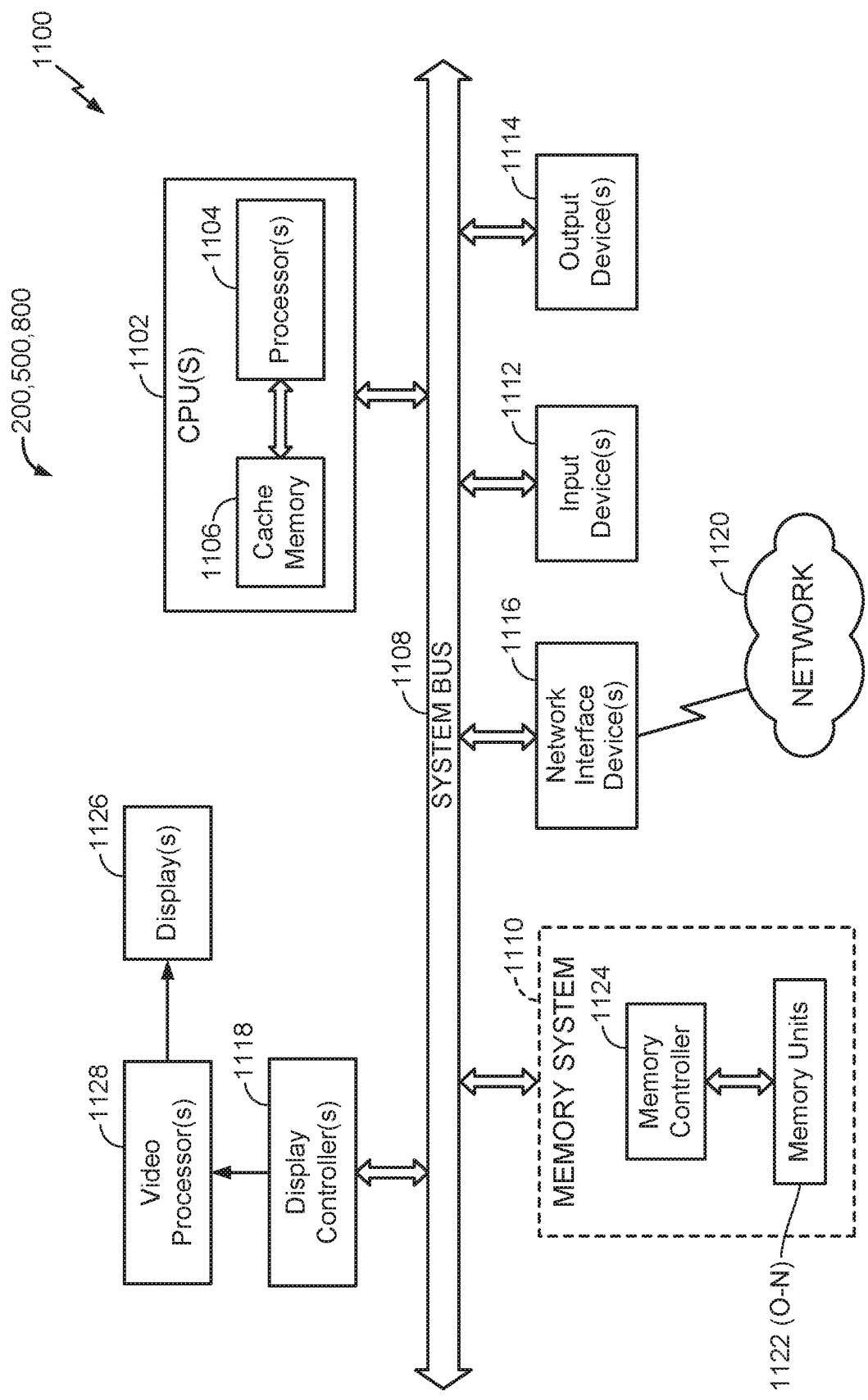
FIG. 11 is a block diagram of an exemplary processor-based system that can employ the host systems of FIGS. 2, 5, and 8 to support the hardware-accelerated storage compression system.

In this regard, FIG. 11 illustrates an example of a processor-based system 1100 that can employ the host system 200 of FIG. 2, the host system 500 of FIG. 5, and the host system 800 of FIG. 8. In this example, the processor-based system 1100 includes one or more central processing units (CPUs) 1102, each including one or more processors 1104.

$$\text{Number of Compression Maps}(N_{MAP}) = \lfloor 64/(n+1) \rfloor \quad \text{(Eq. 2)}$$

The CPU(s) 1102 may have cache memory 1106 coupled to the processor(s) 1104 for rapid access to temporarily stored data. The CPU(s) 1102 is coupled to a system bus 1108. As is well known, the CPU(s) 1102 communicates with other devices by exchanging address, control, and data information over the system bus 1108. Although not illustrated in FIG. 11, multiple system buses 1108 could be provided, wherein each system bus 1108 constitutes a different fabric.

Other master and slave devices can be connected to the system bus 1108. As illustrated in FIG. 11, these devices can include a memory system 1110, one or more input devices 1112, one or more output devices 1114, one or more network interface devices 1116, and one or more display controllers 1118, as examples. The input device(s) 1112 can include any type of input device, including, but not limited to, input keys, switches, voice processors, etc. The output device(s) 1114 can include any type of output device, including, but not limited to, audio, video, other visual indicators, etc. The network interface device(s) 1116 can be any device configured to allow exchange of data to and from a network 1120. The network 1120 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 1116 can be configured to support any type of communications protocol desired. The memory system 1110 can include one or more memory units 1122 (0-N) and a memory controller 1124.

The CPU(s) 1102 may also be configured to access the display controller(s) 1118 over the system bus 1108 to control information sent to one or more displays 1126. The display controller(s) 1118 sends information to the display(s) 1126 to be displayed via one or more video processors 1128, which process the information to be displayed into a format suitable for the display(s) 1126. The display(s) 1126 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but are to be accorded the widest scope consistent with the principles and novel features disclosed herein.

What is claimed is:

1. A host system, comprising:
    a storage controller coupled to a storage device, wherein the storage controller comprises a hardware compression accelerator; and
    a control system configured to provide a write request to the storage controller to write one or more uncompressed data blocks of a data file to the storage device, the data file comprising the one or more uncompressed data blocks, wherein each of the one or more uncompressed data blocks is associated with a respective logical block address (LBA), and each of the one or more uncompressed data blocks have a same size, wherein, for each uncompressed data block among the one or more uncompressed data blocks, the hardware compression accelerator is configured to:
compress the uncompressed data block into a compressed data block;
allocate the compressed data block to a storage data block in the storage device; and
generate a modified LBA to correlate the uncompressed data block with the compressed data block, wherein the modified LBA of the compressed data block comprises a compression indicator and an LBA number, the compression indicator configured to indicate whether the compressed data block has been compressed, and the LBA number configured to include the respective LBA of the uncompressed data block even when the compression indicator indicates that the compressed data block has been compressed, wherein, for each uncompressed data block among the one or more uncompressed data blocks, the control system is configured to update the respective LBA in an indexed-node (inode) with the modified LBA, and wherein each uncompressed data block is individually compressed such that each compressed data block is individually decompressable.

2. The host system of claim 1, wherein for each uncompressed data block among the one or more uncompressed data blocks, the control system is further configured to:
receive the modified LBA from the hardware compression accelerator.

3. The host system of claim 1, wherein for each uncompressed data block among the one or more uncompressed data blocks, the storage controller is configured to write the compressed data block to the storage data block allocated by the hardware compression accelerator.

4. The host system of claim 1, wherein the hardware compression accelerator is further configured to co-locate the compressed data block with at least one other compressed data block in the storage data block when a total size of the compressed data block and the at least one other compressed data block is less than or equal to a size of the storage data block.

5. The host system of claim 4, wherein the hardware compression accelerator is further configured to co-locate the compressed data block with at least one other compressed data block in the storage data block when a total number of the compressed data block and the at least one other compressed data block is less than or equal to a predetermined allocation limit of the storage data block.

6. The host system of claim 4, wherein the storage data block and the uncompressed data block each have a size of four kilobytes (4 KB).

7. The host system of claim 1, wherein the modified LBA further comprises:
a sequence number configured to indicate relative sequence of the compressed data block in the storage data block in which the compressed data block is stored.

8. The host system of claim 1, wherein the storage device coupled to the storage controller is selected from the group consisting of: a hard-disk drive (HDD); a solid-state disk (SSD); an embedded multimedia card (eMMC); a universal flash storage (UFS); and a universal serial bus (USB) device.

9. The host system of claim 1, wherein:
the storage controller further comprises a host controller interface (HCI);
the storage controller is configured to receive the write request encoded in an embedded multimedia card (eMMC) HCI data structure; and
the hardware compression accelerator is configured to provide at least one compression map encoded in an eMMC HCI task descriptor structure.

10. The host system of claim 1, wherein:
the storage controller further comprises a host controller interface (HCI);
the storage controller is configured to receive the write request encoded in a universal flash storage (UFS) HCI data structure; and
the hardware compression accelerator is configured to provide at least one compression map encoded in a UFS HCI transfer request descriptor structure.

11. The host system of claim 1, wherein each compressed data block is uniquely correlated to one uncompressed data block.

12. A method for writing data to a storage device using a hardware-accelerated compression system, comprising:
providing a write request to write one or more uncompressed data blocks of a data file to the storage device, the data file comprising the one or more uncompressed data blocks, wherein each of the one or more uncompressed data blocks is associated with a respective logical block address (LBA), and each of the one or more uncompressed data blocks have a same size; and
for each uncompressed data block among the one or more uncompressed data blocks:
compressing the uncompressed data block into a compressed data block;
allocating the compressed data block to a storage data block in the storage device; and
generating a modified LBA to correlate the uncompressed data block with the compressed data block, wherein the modified LBA of the compressed data block comprises a compression indicator and an LBA number, the compression indicator configured to indicate whether the compressed data block has been compressed, and the LBA number configured to include the respective LBA of the uncompressed data block even when the compression indicator indicates that the compressed data block has been compressed; and
updating the respective LBA in an indexed-node (inode) with the modified LBA,
wherein each uncompressed data block is individually compressed such that each compressed data block is individually decompressable.

13. The method of claim 12, further comprising writing the compressed data block to the storage data block for each uncompressed data block among the one or more uncompressed data blocks.

14. The method of claim 12, further comprising co-locating the compressed data block with at least one other compressed data block in the storage data block when a total size of the compressed data block and the at least one other compressed data block is less than or equal to a size of the storage data block.

15. The method of claim 14, further comprising co-locating the compressed data block with at least one other compressed data block in the storage data block when a total number of the compressed data block and the at least one other compressed data block is less than or equal to a predetermined allocation limit for the storage data block.

16. The method of claim 12, wherein the modified LBA further comprises:

a sequence number configured to indicate relative sequence of the compressed data block in the storage data block in which the compressed data block is stored.

17. The method of claim 12, wherein each compressed data block is uniquely correlated to one uncompressed data block.

18. A host system, comprising:
a storage controller coupled to a storage device, wherein the storage controller comprises a hardware compression accelerator; and
a control system configured to provide a read request to the storage controller to read one or more uncompressed data blocks of a data file from the storage device, the data file comprising the one or more uncompressed data blocks, wherein each of the one or more uncompressed data blocks have a same size,
wherein for each uncompressed data block among the one or more uncompressed data blocks:
the control system is further configured to provide a respective modified logical block address (LBA) that correlates the uncompressed data block with a respective compressed data block in the storage device, wherein the modified LBA comprises a compression indicator and an LBA number, the compression indicator configured to indicate whether the respective compressed data block is compressed, and the LBA number configured to include the respective LBA of the uncompressed data block even when the compression indicator indicates that the compressed data block has been compressed;
the storage controller is configured to retrieve the respective compressed data block from the storage device based on the respective modified LBA;
the hardware compression accelerator is configured to decompress the respective compressed data block into the uncompressed data block; and
the storage controller is further configured to provide the uncompressed data block to the control system,
wherein, for each uncompressed data block among the one or more uncompressed data blocks, the respective LBA in an indexed-node (inode) is updated with the modified LBA, and
wherein each compressed data block is individually decompressable.

19. The host system of claim 18, wherein the modified LBA further comprises:
a sequence number configured to indicate relative sequence of the respective compressed data block in a storage data block in which the respective compressed data block is stored.

20. The host system of claim 19, wherein the storage data block and the uncompressed data block each have a size of four kilobytes (4 KB).

21. The host system of claim 18, wherein the storage device coupled to the storage controller is selected from the group consisting of: a hard-disk drive (HDD); a solid-state disk (SSD); an embedded multimedia card (eMMC); a universal flash storage (UFS); and a universal serial bus (USB) device.

22. The host system of claim 18, wherein:
the storage controller further comprises a host controller interface (HCI); and
the storage controller is configured to:
receive the read request encoded in an embedded multimedia card (eMMC) HCI data structure; and
receive at least one compression map encoded in an eMMC HCI task descriptor structure.

23. The host system of claim 18, wherein:
the storage controller further comprises a host controller interface (HCI); and
the storage controller is configured to:
receive the read request encoded in a universal flash storage (UFS) HCI data structure; and
receive at least one compression map encoded in a UFS HCI transfer request descriptor structure.

24. The host system of claim 18, wherein each compressed data block is uniquely correlated to one uncompressed data block.

25. A method for reading data from a storage device using hardware-accelerated compression system, comprising:
providing a read request to read one or more uncompressed data blocks of a data file from the storage device, the data file comprising the one or more uncompressed data blocks, wherein each of the one or more uncompressed data blocks have a same size; and
for each uncompressed data block among the one or more uncompressed data blocks:
providing a respective modified logical block address (LBA) that correlates the uncompressed data block with a respective compressed data block in the storage device wherein the modified LBA comprises a compression indicator and an LBA number, the compression indicator configured to indicate whether the respective compressed data block is compressed, and the LBA number configured to include the respective LBA of the uncompressed data block even when the compression indicator indicates that the compressed data block has been compressed;
retrieving the respective compressed data block from the storage device based on the respective modified LBA; and
decompressing the respective compressed data block into the uncompressed data block,
wherein, for each uncompressed data block among the one or more uncompressed data blocks, the respective LBA in an indexed-node (inode) is updated with the modified LBA, and
wherein each compressed data block is individually decompressable.

26. The method of claim 25, wherein the modified LBA further comprises:
a sequence number configured to indicate relative sequence of the compressed data block in a storage data block in which the compressed data block is stored.

27. The method of claim 26, wherein the storage data block and the uncompressed data block each have a size of four kilobytes (4 KB).

28. The method of claim 25, wherein the storage device is selected from the group consisting of: a hard-disk drive (HDD); a solid-state disk (SSD); an embedded multimedia card (eMMC); a universal flash storage (UFS); and a universal serial bus (USB) device.

29. The method of claim 25, wherein each compressed data block is uniquely correlated to one uncompressed data block.

* * * * *